3,207,815
FREE-RADICAL POLYMERIZATION PROCESS WITH BIS(2-BENZTHIAZOLE) ACCELERATORS
Louis A. Joo, John B. Braunwarth, and Charanjit Rai, Crystal Lake, Ill., assignors to The Pure Oil Company, Chicago, Ill., a corporation of Ohio
No Drawing. Filed July 13, 1962, Ser. No. 209,792
15 Claims. (Cl. 260—862)

This invention relates to new polymerization accelerators comprising bis(2-benzothiazole), α,ω-bis(2-benzothiazolyl)alkanes, and derivatives thereof. More particularly, this invention relates to the discovery that bis(2-benzothiazole), α,ω-bis(2-benzothiazolyl)alkanes, and derivatives thereof are effective polymerization accelerators for peroxide-initiated polymerizable systems.

The polymerization of certain polymerizable systems, such as resin systems containing unsaturated polyesters and cross-linking monomers, proceed by a free-radical mechanism which involves opening of the double bonds in the polyester chains or monomer. These activated radicals open other double bonds, adding to one of the electrons in the double linkage and freeing the other electron to form a new free radical. The co-polymerization reaction is commonly initiated by the addition of so-called catalysts, such as organic peroxides and hydroperoxides, which decompose to very active free radicals that become the centers for polymer growth. Although these substances are commonly known in the art as catalysts, they would better be called "initiators," as proposed by the International Union of Pure and Applied Chemistry, since they take part in the reaction. "Accelerators" or "promoters" are added to such resin systems to speed the decomposition of the catalyst or initiator into free radicals at room temperature, or at temperatures considerably below those required to release free radicals when catalyst alone is used. While some of the accelerators which have been heretofore proposed or used are effective with peroxide and hydroperoxide catalysts, many are most effective with only either peroxide or hydroperoxide catalysts. For example, cobalt naphthenate is most effective with methyl ethyl ketone peroxide while dimethyl aniline is most effective with benzoyl peroxide. A more detailed discussion of polyester catalysis can be found in Chapter 6 of "Polyester Resins" by John R. Lawrence, published by Reinhold Publishing Corporation, 1960, and Chapter 3 of "Polyesters and Their Applications" by Bjorksten, published by Reinhold Publishing Corporation, 1956.

In accordance with this invention, we have discovered that bis(2-benzothiazole), substituted bis(2-benzothiazoles), α,ω-bis(2-benzothiazolyl)alkanes, and substituted α,ω-bis(2-benzothiazolyl)alkanes are effective polymerization accelerators for peroxide-initiated polymerizations.

It is a primary object of this invention to provide new polymerization accelerators comprising bis(2-benzothiazole), α,ωbis(2-benzothiazolylalkanes, and derivatives thereof.

Another object of this invention is to provide a polymerizable system containing sufficient amount of bis(2-benzothiazole), α,ω-bis(2-benzothiazolyl)alkanes, or derivatives thereof, to accelerate the polymerization of such systems.

Still another object of this invention is to provide a free-radical-initiated polymerizable system containing a sufficient amount of bis(2-benzothiazole), α,ω-bis(2-benzothiazolyl)alkanes, or derivatives thereof, to accelerate the polymerization of such systems.

Still another object of this invention is to provide a peroxide-initiated, polymerizable system containing a sufficient amount of bis(2-benzothiazole), α,ω-bis(2-benzothiazolyl)alkanes, or derivatives thereof, to accelerate the polymerization of such systems.

A still further object of this invention is to provide a method of accelerating the polymerization of peroxide-initiated vinyl and polyester polymerizable systems by adding to the systems small amounts of bis(2-benzothiazole), α,ω-bis(2-benzothiazolyl)alkanes, or derivatives thereof.

A further object of this invention is to provide a method of accelerating the polymerization of a polymerizable system containing a peroxide initiator by adding to the system a small amount of bis(2-benzothiazole), α,ω-bis(2-benzothiazolyl)alkanes, and derivatives thereof.

These and further objects of this invention will be described or become apparent as the description herein proceeds.

The new polymerization accelerators of this invention are represented by the formula,

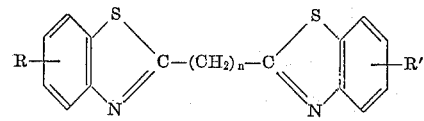

wherein $n$ has a value of 0 to 12 and R and R' are hydrogen, or the same or different hydrocarbon radicals containing from 1 to 20 carbon atoms. These compounds are prepared by various known methods, such as described in J. Chem. Soc., 2393 (1928) by M. A. Phillips; Ber., 13, 1231 (1880) and Ber., 20, 2251 (1887) by A. W. Hofman; J. Chem. Soc., 121, 464 (1922) by W. A. Mills; Rai and Braunwarth, J. Org. Chem., 26, 3434 (1961); and in U.S. patent application 151,190, filed November 9, 1961, now abandoned. The method of preparing the instant compounds as described in said application consists of reacting an o-aminothiophenol (or polycyclic aromatic analogs thereof) with a dibasic acid in the presence of polyphosphoric acid as a catalyts. The polyphosphoric acid which is used as a catalyst in the preparation of the compounds is a commercial product consisting of a liquid mixture of polymeric phosphoric acids having a $P_2O_5$ content in the range of about 72–90%, preferably about 82–84%. In general, reaction periods ranging from less than one-half hour to about two hours are adequate for the reaction to go substantially to completion at temperatures ranging from about 100°–200° C. The severity of conditions required to cause the desired reaction to occur depend on the specific reactant being condensed with the o-aminothiophenol, and must be selected with care to avoid undesirable side reactions.

R and R' can be hydrogen or hydrocarbon radicals, such as alkyl, alkylene, aryl, aralkyl, aralkylene, alkaryl, and cycloalkyl radicals. Radicals in the aliphatic series include methyl, ethyl, propyl, isopropyl, butyl, isobutyl, t-butyl, amyl, isoamyl, t-amyl, hexyl, isohexyl, heptyl, isoheptyl, octyl, isooctyl, nonyl, isononyl, decyl, ethenyl, butenyl, butadienyl, isoheptenyl, etc. The aryl groups includes phenyl, biphenyl, napthyl, anthryl, etc.; the aryl-substituted aliphatic radicals include benzyl, phenylethyl, phenylethenyl, phenylbutadienyl, etc.; the aliphatic-substituted aryl radicals include tolyl, xylyl, butenylnaphthyl, butadienylnaphthyl, etc.; and the cycloalkyl radicals include cyclopropyl, cyclobutyl, cyclopentyl, and cyclohexyl radicals. Radicals in the aliphatic series are preferably limited to those containing up to 10 carbon atoms. From the above definition, it will be apparent that polycyclic aryl radicals and aliphatic-substituted derivatives thereof can be attached to the thiazole groups.

Species of compounds that come within the foregoing definition when R and R' are hydrogen are:

Bis(2-benzothiazole)
Bis(2-benzothiazolyl)methane
1,2-bis(2-benzothiazolyl)ethane
1,3-bis(2-benzothiazolyl)propane
1,4-bis(2-benzothiazolyl)butane
1,5-bis(2-benzothiazolyl)pentane
1,10-bis(2-benzothiazolyl)decane
1,12-bis(2-benzothiazolyl)dodecane Examples when R and/or R' are aliphatic radicals are:

Bis-[2-(4-methyl)benzothiazole]
Bis-[2-(6-ethenyl)benzothiazole]
Bis-[2-(7,7'-dimethyl)benzothiazole]
Bis-[2-(5,7'-diethyl)benzothiazole]
Bis-[2-(5-butadienyl)benzothiazole]
Bis-[2-(4-methyl,6-nonyl,5'-ethyl,7'-decyl)benzothiazole]
Bis-[2-(5-ethyl)benzothiazolyl]methane
Bis-[2-(6,6'-dimethyl)benzothiazolyl]methane
1,2-bis-[2-(4,5-dioctyl)benzothiazolyl]ethane
1,2-bis-[2-(4,4',6,6'-tetraisopropyl)benzothiazolyl]
  ethane
1,3-bis-[2-(6,6'-dihexyl)benzothiazolyl]propane
1,3-bis-[2-(5,6-di-t-butyl)benzothiazolyl]propane
1,4-bis-[2-(4-methyl,5-butyl,6'-propyl)benzothiazolyl]
  butane
1,5-bis-[2-(5-(1,3-butadienyl),7'-heptyl)benzothiazolyl]
  pentane
1,10-bis-[2-(4,4'-dioctyl)benzothiazolyl]decane
1,9-bis-[2-(4,5,6',7'-tetramethyl)benzothiazolyl]nonane
1,2-bis-[2-(5-methyl)naphthothiazolyl]ethane
1,5-bis-[2-(4-ethyl-8'-methyl)naphthothiazolyl]pentane
1,3-bis-[2-(4-phenylethenyl)naphthothiazolyl]propane
1,4-bis-[2-(6,9'-dipropyl)naphthothiazolyl]butane
1,5-bis-[2-(4,8'-dimethyl,5-ethyl)naphthothiazolyl]
  pentane
Bis-[2-(6,8-diethyl-4',9'-dimethyl)naphthothiazolyl]
  methane Examples when R and/or R' are aryl radicals are:

Bis-[2-(4-phenyl)benzothiazolyl]methane
1,7-bis-[2-(5,7'-diphenyl)benzothiazolyl]heptane
1,8-bis-[2-(4-phenyl,5'-biphenyl)benzothiazolyl]
  octane
1,7-bis-[2-(6-naphthyl)benzothiazolyl]heptane
Bis(2-naphthothiazolyl)methane
1,2-bis-(2-naphthothiazolyl)ethane
1,3-bis(2-naphthothiazolyl)propane
1,5-bis(2-naphthothiazolyl)pentane
1,10-bis(2-naphthothiazolyl)decane
1,3-bis-[2-(8-phenyl)naphthothiazolyl]propane
1,6-bis-[2-(4,7'-diphenyl)naphthothiazolyl]hexane
1,4-bis-[2-(6-phenyl,5'-biphenyl)naphthothiazolyl]
  butane
1,3-bis-[2-(5-naphthyl)naphthothiazolyl]propane
Bis-[2-(5-phenyl)benzothiazole]
Bis-[2-(4,7'-diphenyl)benzothiazole]
1,2-bis-(2-anthrothiazolyl)ethane
Bis(2-phenanthrothiazolyl)methane Examples when R and/or R' are aryl-substituted aliphatic radicals are:

Bis-[2-(6-benzyl)benzothiazole]
Bis-[2-(5-phenylethyl,6'-benzyl)benzothiazole]
1,4-bis-[2-(5-benzyl)benzothiazolyl]butane
1,6-bis-[2-(6-benzyl-7'-benzyl)benzothiazolyl]hexane
1,8-bis-[2-(7-phenylethyl)benzothiazolyl]octane
1,5-bis-[2-(5-styryl)benzothiazolyl]pentane
Bis-[2-(6-phenylethyl-4'-benzyl)benzothiazolyl)
  methane Examples when R and/or R' are aliphatic-substituted aryl radicals are:

Bis-|2-[4-(m-ethylphenyl)]benzothiazole|
1,4-bis-|2-[5-(p-vinylphenyl)]benzothiazolyl|butane
1,5-bis-|2-[6,6'-di(m-propylphenyl)]benzothiazolyl|
  pentane
1,7-bis-|2-[7-(p-ethyphenyl)]naphthothiazolyl|heptane
1,3-bis-|2-[5,8'-di(m-ethylphenyl)[naphthothiazolyl|
  propane
1,8-bis-|2-[6-(p-tolyl]naphthothiazolyl|octane
1,10-bis-|2-]7-(m-cumyl)]naphthothiazoyl|decane Example when R and R' are mixed aliphatic cycloalkyl, or aryl radicals are:

Bis-[2-(5-ethyl-6'-phenyl)benzothiazole]
Bis-[2-(4,5-dimethyl,6-cyclopentyl)benzothiazole]
Bis-[2-(4-methyl-4'-phenyl)benzothiazoyl]methane
1,3-bis-[2-(5-t-butyl-6'-naphthyl)benezothiazolyl]
  propane
1,4-bis-[2-(6,7-diethyl, 4'-phenyl)benzothiazolyl]
  butane
1,5-bis-[2-(4-cyclohexyl,5'-phenyl)benzothiazolyl]
  pentane
1,6-bis-[2-(5-methyl,6-phenyl,4'-ethyl,7'naphthyl)
  benzothiazolyl]hexane
1,7-bis-[2-(4,5,6,7-tetraethyl,4'-cyclohexyl)
  benzothiazolyl]heptane
1,2-bis-[2-(5-methyl,8'-phenyl)naphthothiazolyl]
  ethane
1,3-bis-[2-(6-ethenyl,7'-phenyl)naphthothiazolyl]
  propane
1,4-bis-[2-(5-cyclohexyl,8'-phenyl)naphthothiazolyl]
  butane
1,5-bis-[2-(7-ethyl,8'-naphthyl)naphthothiazolyl]
  pentane
1,1-bis-[2-(6-(2,4-pentadienyl),7'-phenyl)
  naphthothiazolyl]hexane In accordance with our invention, any one or mixtures of two or more of the foregoing compounds are added in a small amount to a polymerizable system containing a peroxide catalyst. The amount utilized will be varied depending on such factors as the polymerizable compounds used, reaction products desired, catalyst used, reaction temperature, etc. The accelerators are preferably added in an amount of about 0.001% to 5.0% by weight of the polymerizable materials since no particular advantage is gained by using greater amounts. The novel polymerization accelerators serve to speed the decomposition of the catalyst or initiator into free radicals, which become centers for polymer growth, at room temperature or at temperatures considerably below those required to release free radicals when the catalyst alone is used.

In some instances, the solubility of the specific polymerization accelerator utilized in a particular polymerizable system will limit the range of concentrations practicable. As shown in Table I, bis (2-benzothiazole) is characterized by low solubility in styrene at low temperatures. Higher temperatures, hydrocarbon substituents on the benzene ring of the benzothiazole, or a methylene chain between the benzothiazolyl groups will permit a wider range of concentrations of the polymerization accelerator to be used.

*Table I*

| Temperature, °C.: | Gm. bis(2-benzothiazole) /100 g. styrene |
|---|---|
| 20 | 0.01 |
| 40 | 0.01 |
| 60 | 0.02 |
| 80 | 0.30 |

Care should be taken in the addition of the catalyst and accelerator to the resin system. For example, adding a peroxide catalyst with an accelerator to a polymerizable system might result in an explosion. One acceptable method of adding the catalytic substances is to add the catalyst first, mix it in well, and then add the accelerator. Another method is to divide the resin system into two parts, one of which is usually larger than the other, mix the catalyst into the larger part and the accelerator into the smaller part, and combine the two parts. The catalytic substances must be evenly and thoroughly distributed throughout the resin to avoid local saturation and resulting hard spots. At the same time, the agitation must not be so violent as to introduce air into the resin since the trapped air will result in voids in the product.

Peroxide-initiated polymerizable compounds with which the novel polymerization accelerators of this invention are useful include the various polymerizable monomers and mixtures of monomers. These include the various polymerizable monomers having a terminal ethylenic group, i.e., $CH_2=C<$, such as styrene; substituted styrenes, e.g., divinyl benzene, alpha-methyl styrene, vinyl toluene, dichlorostyrene, vinyl ethylbenzene, etc.; vinyl halide compounds, e.g., vinyl chloride, vinylidene chloride, vinyl bromide, etc.; diolefin compounds, e.g., butadiene-1,3, 2-methyl butadiene-1,3 chloroprene, 2-cyanobutadiene-1,3; vinyl ethers and esters, e.g., divinyl ether, vinyl acetate, vinyl propionate, vinyl acrylate, divinyl oxalate, etc.; vinyl ketones, e.g., divinyl ketone, vinyl ethyl ketone, etc.; acrylic and methacrylic acids and derivatives thereof including the nitriles of said acids, e.g., acrylonitrile, the amides of said acids, e.g., acrylamide, esters, of an acrylic acid, e.g., ethyl acrylate, butyl acrylate, methyl methacrylate, propyl methacrylate, propyl alpha-chloroacrylate, benzyl acrylate, chlorobenzyl acrylate, etc.; polyesters of acrylic acids, e.g., ethylene diacrylate, etc.; allyl and methallyl ethers and allyl and methallyl esters of monocarboxylic and polycarboxylic saturated and unsaturated acids, e.g., vinyl allyl ether, diallyl phthalate, diallyl carbonate, diallyl maleate, etc.; and the like.

The novel polymerization accelerators are also useful where a peroxide is used to initiate the cross-linking of a linear unsaturated polyester resin with a monomer having a terminal ethylenic group to form a thermosetting polymer. The polymerization accelerators of this invention may also be used in combination with a peroxide catalyst to cause a certain amount of reaction between double bonds in linear polyester resins resulting in the formation of a cross-linked structure. Polyester resins are the polycondensation products of dicarboxylic acids with dihydroxy alcohols. These compounds may be modified by monocarboxylic acids, monohydroxy alcohols, and even small amounts of polycarboxylic acids or polyhydroxy alcohols. The unsaturated polyester resins are produced when any of the reactants contain nonaromatic unsaturation. Examples of acids used in the preparation of polyesters are unsaturated dibasic acids, such as maleic acid, fumaric, chloromaleic, itaconic acid, citraconic acid, etc.; saturated dibasic acids, such as succinic acid, glutaric acid, adipic acid, pimelic acid, suberic acid, etc.; and monocarboxylic acids which are utilized as modifiers, such as acetic, caproic acid, lauric acid, myristic acid, oleic acid, etc. Alcohols used in the preparation of polyester resins include unsaturated dihydroxy compounds, such as allyl alcohol, 2,5-dimethyl 3-hexyne- 2,5-diol, 2-butene-1,4-diol, etc.; saturated dihydroxy compounds such as ethylene glycol, propylene glycol, diethylene glycol, dipropylene glycol, etc.; and monohydric alcohols which are used as modifiers, such as n-butanol, propanol, isopropanol, 2-ethyl hexanol, etc.

The term "acid" as used herein is intended to cover the anhydride as well as the acid since the anhydride may be used whenever available and desirable.

Illustrative of unsaturated polyester resins are propylene glycol maleate, diethyl fumarate, diethyl maleate, dibutyl fumarate, ethylene glycol fumarate, diallyl maleate, diallyl fumarate, dimethallyl maleate, etc.

Some of the peroxides which may be utilized as catalysts or initiators in accordance with this invention in conjunction with the polymerization accelerators are: cumene hydroperoxide, dichloro-benzoyl peroxide, tertiary butyl hydroperoxide, benzoyl peroxide, tertiary butyl perbenzoate, acetyl benzoyl peroxide, caprylyl peroxide, lauryl peroxide, hydroxyheptyl peroxide, methyl ethyl ketone peroxide, 1-hydroxycyclohexyl hydroperoxide-1, ditertiary butyl perphthalate, dibenzaldiperoxide, tertiary butyl peroxide, 2,2-(tertiary butylperoxy)butane, bis(parabromobenzoyl)peroxide, bis(para-chlorobenzoyl)peroxide, bis(succinyl)peroxide, and bis(chloroacetyl)peroxide, as well as said peroxide catalysts compounded with other compounds, such as benzoyl peroxide compounded with tricresyl phosphate, benzoyl peroxide compounded with dibutyl phthalate, methyl ethyl ketone peroxide in dimethyl phthalate, and cyclohexanone peroxide compounded with dibutyl phthalate. In general, the peroxide initiators are added to the polymerizable system in an amount from about 0.1 to 10% by weight of the polymerizable materials, with a range of about 0.25 to 5% being preferred.

In order to demonstrate the effectiveness of the novel polymerization accelerators of this invention, experiments were conducted in which styrene was polymerized at ambient and elevated temperatures. In one series of experiments, small amounts of 1,2-bis(2-benzothiazolyl)-ethane, as a typical example of the polymerization accelerators of this invention, were added to two separate portions of styrene, containing 0.3% by weight of methyl ethyl ketone peroxide, in amounts of 0.01% and 0.20% by weight. Then the solutions were stored at room temperature, and their viscosities, which are indicative of polymerization, were checked periodically using a Gardner Bubble Viscometer. The viscosity of the accelerator-containing styrene solutions was compared with the viscosity of a third portion of styrene containing only methyl ethyl ketone peroxide. The results are given in Table II.

*Table II*

| Sample Number | Catalyst | Catalyst concentration, weight percent | Accelerator | Accelerator concentration, weight percent | Viscosity (stokes) after— | | | |
|---|---|---|---|---|---|---|---|---|
| | | | | | 4 days | 5 days | 7 days | 9 days |
| 1 | Methyl ethyl ketone peroxide. | 0.3 | None | | <0.5 | 0.66 | 2.2 | 6.4 |
| 2 | ----do---- | 0.3 | 1,2-bis(2-benzo-thiazolyl)ethane. | 0.01 | <0.5 | 0.69 | 2.45 | 8.9 |
| 3 | ----do---- | 0.3 | ----do---- | 0.20 | 0.58 | 1.32 | 6.7 | 36.0 |

In order to compare the effectiveness of our accelerators with known commercial accelerators, another series of experiments was conducted in which the effectiveness of bis(2-benzothiazole) and 1,2-bis(2-benzothiazolyl)ethane was compared with cobalt naphthenate in separate samples of styrene containing 1.0% by weight of methyl ethyl ketone peroxide, and with dimethylaniline in separate samples of styrene containing 1.0% by weight of benzoyl peroxide. The samples were maintained at 80° C., and the viscosities were checked every two hours using a Gardner Bubble Viscometer. The results of this series of experiments are given in Table III.

Table III

| Sample Number | Catalyst | Catalyst concentration, weight percent | Accelerator | Accelerator concentration, weight percent | Viscosity (Stokes) After | | | | |
|---|---|---|---|---|---|---|---|---|---|
| | | | | | 2 hours | 4 hours | 6 hours | 8 hours | 10 hours |
| 4 | Methyl ethyl ketone peroxide. | 1.0 | Cobalt naphthenate | 1.5 | <0.5 | 0.5 | 1.6 | 5.2 | 17.0 |
| 5 | ____do____ | 1.0 | Bis(2-benzothiazole) | 0.33 | <0.5 | 0.87 | 5.0 | 40.0 | (Gelled) |
| 6 | ____do____ | 1.0 | 1,2-bis(2-benzothiazolyl)-ethane. | + 1.0 | <0.5 | <0.5 | 4.6 | (Gelled) | (Gelled) |
| 7 | Benzoyl peroxide | 1.0 | Dimethylaniline | 1.0 | <0.5 | <0.5 | 0.6 | 1.2 | 2.4 |
| 8 | ____do____ | 1.0 | Bis(2-benzothiazole) | 0.33 | <0.5 | 3.7 | 82.0 | (Gelled) | (Gelled) |
| 9 | ____do____ | 1.0 | 1,2-bis(2-benzothiazolyl) ethane. | 1.0 | <0.5 | <0.5 | 5.9 | (Gelled) | (Gelled) |

From an inspection of Tables II and III, it will be seen that the instant compounds, as represented by bis(benzothiazole) and 1,2-bis(2-benzothiazolyl)ethane are effective accelerators for peroxide-initiated polymerizable systems. Referring to Table II, Sample Number 1, which contained the catalyst but no accelerator, had a viscosity of 6.4 stokes after 9 days, whereas Samples 2 and 3, containing 0.01 and 0.20% by weight, respectively, of the accelerator had viscosities of 8.9 and 36.0 stokes. Referring to Table III, the addition of 1.5% by weight of cobalt naphthenate to styrene containing 1.0% by weight of methyl ethyl ketone peroxide (Sample 4) resulted in a viscosity of 17 stokes after 10 hours. On the other hand, the addition of 0.33% by weight of bis(2-benzothiazole) and 1.0% by weight of 1,2-bis(2-benzothiazolyl)ethane to styrene solutions containing 1.0% by weight of methyl ethyl ketone peroxide resulted in gellation within 10 and 8 hours, respectively. Similar results were obtained with Samples 7, 8 and 9, where the effectiveness of bis(2-benzothiazole) and 1,2-bis(2-benzothiazolyl)ethane were compared with dimethyl-aniline in styrene solutions containing 1.0% by weight of benzoyl peroxide.

Results similar to those depicted in Tables III and IV are obtained substituting other polymerizable systems for the styrene, other catalysts or initiators, and other polymerization accelerators. Examples of polymerizable systems, catalysts or initiators, and polymerization accelerators are set forth in Table IV.

lymerizable system, in an amount sufficient to accelerate the polymerization thereof, a compound of the formula,

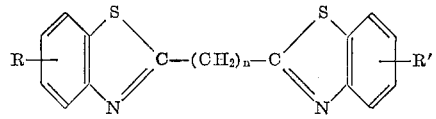

wherein $n$ is an integer from 0 to 12, and R and R' independently of each other are a member selected from the group consisting of hydrogen and hydrocarbon radicals containing from 1 to about 20 carbon atoms; and thereafter allowing said polymerizable system to polymerize.

2. A method in accordance with claim 1 in which R and R' are hydrogen.

3. A method in accordance with claim 2 in which said compound is bis(2-benzothiazole).

4. A method in accordance with claim 2 in which said compound is 1,2-bis(2-benzothiazolyl)ethane.

5. A method in accordance with claim 1 in which R is hydrogen and R' is a hydrogen radical containing from 1 to about 10 carbon atoms in any aliphatic portions thereof.

6. A method in accordance with claim 1 in which R and R' are hydrocarbons containing from 1 up to about 10 carbon atoms in any aliphatic portions thereof.

7. A method in accordance with claim 1 in which said compound is added in amount from about 0.001% to Table IV

| System Number | Polymerizable system, parts by weight | Catalyst, parts by weight | Accelerator, parts by weight |
|---|---|---|---|
| 1 | Propylene glycol maleate, 70 parts; styrene, 30 parts. | Methyl ethyl ketone peroxide, 1.0 parts | Bis(2-benzothiazole), 0.40 parts. |
| 2 | Acrylonitrile, 65 parts; butadiene, 35 parts | Lauryl peroxide, 1.0 parts | Bis[2-(5-ethyl)benzothiazolyl] methane, 0.60 parts. |
| 3 | Vinyl chloride, 80 parts; styrene, 20 parts | Cumene hydroperoxide, 1.0 parts | 1,5-bis(2-benzothiazolyl)pentane, 0.60 parts. |
| 4 | Diallyl fumarate, 70 parts; vinyl-toluene, 30 parts. | Tertiary butyl hydroperoxide, 1.0 parts | Bis[2-(4-methyl)benzothiazole] 0.50 parts. |
| 5 | Ethylene glycol fumarate, 60 parts; allyl diglycolate, 40 parts. | Tertiary butyl perbenzoate, 1.0 parts | 1,4-bis[2-(6-benzyl)benzothiazolyl] butane, 0.90 parts. |
| 6 | Butyl methacrylate, 40 parts; castor oil vinylalkyd, 60 parts. | Tertiary butyl, hydroperoxide, 1.0 parts | Bis(2-benzothiazole), 0.35 parts. |

Although this invention has been described in relation to specific embodiments, it will be apparent that modifications can be made by one skilled in the art without departing from the intended scope of this invention. For example, the polyester resins may be modified with materials such as oils, e.g., tung, linseed, castor, cottonseed, coconut oils, etc., resin, silicones, and the like.

The embodiments of this invention in which an exclusive property or privilege is claimed are defined as follows:

1. In the method of polymerizing a polymerizable system, containing at least one polymerizable compound having a terminal ethylenic group, which is polymerizable in the presence of a free radical-releasing peroxide catalyst, said polymerizable system containing an effective amount of said catalyst to produce polymerization, the improvement which comprises adding to said po- 5.0% by weight of the polymerizable materials contained in said polymerizable system.

8. A method in accordance with claim 7 in which said compound having a terminal ethylenic group is styrene.

9. A method in accordance with claim 7 in which said polymerizable system consists essentially of compounds having terminal ethylenic groups.

10. A method in accordance with claim 7 in which said polymerizable system consists essentially of a compound having a terminal ethylenic group and an unsaturated polyester resin.

11. A method in accordance with claim 1 in which said catalyst is an organic peroxide.

12. A method in accordance with claim 11 in which said catalyst is selected from the group consisting of methyl ethyl ketone peroxide and benzoyl peroxide.

13. In the method of polymerizing a polymerizable system which is polymerizable in the presence of a free radical-releasing peroxide catalyst, said polymerizable system containing at least one polymerizable compound having a terminal ethylenic group and said catalyst in an amount from about 0.1% to 10% by weight of the polymerizable materials, the improvement which comprises adding to said polymerizable system, in an amount from about 0.001% to 5.0% by weight of said polymerizable materials, a compound of the formula,

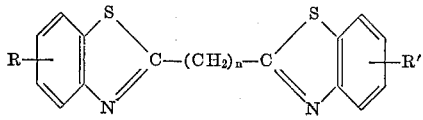

wherein $n$ is an integer from 0 to 12, and R and R' independently of each other are a member selected from the group consisting of hydrogen and hydrocarbon radicals containing a total of 1 to about 20 carbon atoms, with 10 carbon atoms in any aliphatic portion of said hydrocarbon radical; and thereafter allowing said polymerizable system to polymerize.

14. A method in accordance with claim 13 in which said polymerizable system consists essentially of at least one compound having a terminal ethylenic group and R and R' are hydrogen.

15. A method in accordance with claim 14 in which said catalyst is selected from the group consisting of methyl ethyl ketone peroxide and benzoyl peroxide, and said polymerizable system consists essentially of styrene.

References Cited by the Examiner

UNITED STATES PATENTS

| 2,321,305 | 6/43 | Messer | 260—788 |
| 2,857,358 | 10/58 | Thomas | 260—862 |
| 3,066,115 | 11/62 | Smith et al. | 260—93.5 |

OTHER REFERENCES

Mills: J. Chem. Soc., 121 (1922), page 464.

JOSEPH L. SCHOFER, *Primary Examiner.*

DONALD E. CZAJA, *Examiner.*